(12) United States Patent
Soman et al.

(10) Patent No.: US 12,143,650 B2
(45) Date of Patent: Nov. 12, 2024

(54) METHODS AND SYSTEMS FOR SIMULATING EXPERIENCE OF ATTENDING A LIVE PROGRAM FOR VIEWERS OF LIVESTREAMING CONTENT

(71) Applicant: Star India Private Limited, Mumbai (IN)

(72) Inventors: Nikhil Soman, Mumbai (IN); Lenin S. D'Souza, Mumbai (IN); Piyush Chourasiya, Mumbai (IN); Sanjit M. Rane, Mumbai (IN); Piyush Gupta, Mumbai (IN)

(73) Assignee: STAR INDIA PRIVATE LIMITED, Mumbai (IN)

( * ) Notice: Subject to any disclaimer, the term of this patent is extended or adjusted under 35 U.S.C. 154(b) by 0 days.

(21) Appl. No.: 17/715,939

(22) Filed: Apr. 7, 2022

(65) Prior Publication Data

US 2022/0329881 A1  Oct. 13, 2022

(30) Foreign Application Priority Data

Apr. 9, 2021 (IN) .............................. 202121016850

(51) Int. Cl.
*H04N 21/233* (2011.01)
*H04N 21/2187* (2011.01)
*H04N 21/24* (2011.01)
*H04N 21/472* (2011.01)

(52) U.S. Cl.
CPC ....... *H04N 21/233* (2013.01); *H04N 21/2187* (2013.01); *H04N 21/2407* (2013.01); *H04N 21/472* (2013.01)

(58) Field of Classification Search
CPC ............ H04N 21/233; H04N 21/2187; H04N 21/2407; H04N 21/472; H04N 21/41407; H04N 21/4756; H04N 21/4788; H04N 21/234; H04H 20/38
See application file for complete search history.

(56) References Cited

U.S. PATENT DOCUMENTS

2015/0128162 A1* 5/2015 Ionescu .............. H04N 21/2668 725/14
2021/0377615 A1* 12/2021 DeWitt ............ H04N 21/41415

* cited by examiner

*Primary Examiner* — Alazar Tilahun
(74) *Attorney, Agent, or Firm* — Kwan & Olynick LLP

(57) ABSTRACT

Methods and systems for simulating experience of attending a live program for viewers of a livestreaming content are disclosed. A livestreaming content viewed by a plurality of viewers on respective electronic devices is tracked to detect an event. Viewer interaction data are received from the respective electronic devices associated with the plurality of viewers in response to a detected event in the livestreaming content. The viewer interaction data includes viewer responses of the plurality of viewers in response to the detected event. The viewer interaction data received from the plurality of viewers are aggregated. A cheering audio is synthesized in relation to the detected event based on the aggregated viewer interaction data. An enriched livestreaming content is generated based on the livestreaming content and the cheering audio. Playback of the enriched livestreaming content is facilitated on the respective electronic devices for the plurality of viewers.

25 Claims, 8 Drawing Sheets

METHODS AND SYSTEMS FOR SIMULATING EXPERIENCE OF ATTENDING A LIVE PROGRAM FOR VIEWERS OF LIVESTREAMING CONTENT

CROSS REFERENCE TO RELATED APPLICATIONS

This application claims priority from Indian provisional patent application 202121016850, filed on Apr. 9, 2021, which is incorporated herein in its entirety by this reference thereto.

TECHNICAL FIELD

The present technology generally relates to the delivery of digital content such as streaming content to content viewers and, more particularly, to systems and methods for simulating the experience of attending a live program for viewers of livestreaming content associated with the live program.

BACKGROUND

In recent times, digital content streaming, and especially livestreaming content, has been hugely popular among viewers of digital content. Livestreaming of content, i.e., streaming audiovisuals of live programs or events from event venues in substantially real-time enables content viewers to view a variety of live programs in an affordable and convenient way. For example, content viewers may be provided with options to view livestreaming content related to sports, musical shows, theatrical performances, etc., which are held at different, remote event venues. The content viewers may pick and choose the content of their choice and watch the content in real-time without having to pay expensive ticketing fees or endure the hassle of traveling to the respective event venues.

For all the benefits offered by livestreaming content, there are also some drawbacks to livestreaming content. For example, a content viewer may not be able to experience the same feeling or vibe as that of physically attending the live event. In one illustrative scenario, spectators watching a soccer game in a stadium may create a Mexican wave and, in general, create an electrifying atmosphere in the stadium. Although a viewer of the livestreaming content may be equally thrilled, the viewer may not be able to participate in the Mexican wave or experience the vibe of the electrifying atmosphere in the stadium. Moreover, the content viewers have no way to share their emotions with other content viewers, as spectators at the event venues generally do. For example, a content viewer may not be able to express joy or displeasure at various incidents that may occur during a live program like spectators, who are physically present at the event venues.

Some recent solutions offer chat rooms to viewers of livestreaming content to enable content viewers to interact with other content viewers and express their emotions during livestreaming. For example, content viewers may exchange chat messages, personal videos, smileys, custom icons, etc., with other content viewers throughout an event being livestreamed to the content viewers. Though such solutions allow content viewers to exchange emotions in relation to the livestreaming content in substantially real-time, these solutions cannot still simulate the experience of attending a live program.

Accordingly, there is a need to facilitate increased engagement for content viewers of livestreaming content while overcoming the drawbacks of current livestreaming solutions. Further, it would be advantageous to simulate the experience of attending a live program for a content viewer of livestreaming content to enhance the overall quality of experience provided to the content viewer.

SUMMARY

In an embodiment of the invention, a computer-implemented method for simulating experience of attending a live program for viewers of livestreaming content associated with the live program is disclosed. The method tracks, by a system, a livestreaming content viewed by a plurality of viewers on respective electronic devices to detect an event occurring within the live program. The method receives, by the system, viewer interaction data from the respective electronic devices associated with the plurality of viewers in response to a detected event in the livestreaming content. The viewer interaction data includes viewer responses of the plurality of viewers in response to the detected event. The method aggregates, by the system, the viewer interaction data received from the plurality of viewers. The method synthesizes, by the system, a cheering audio in relation to the detected event based, at least in part, on the aggregated viewer interaction data. The method generates, by the system, an enriched livestreaming content based on the livestreaming content and the cheering audio. The method facilitates, by the system, playback of the enriched livestreaming content on the respective electronic devices for the plurality of viewers. The enriched livestreaming content is configured to simulate an experience of attending the live program for the plurality of viewers.

In an embodiment of the invention, a system for simulating experience of attending a live program for viewers of livestreaming content associated with the live program is disclosed. The system includes a memory and a processor. The memory stores instructions, that when executed by the processor, cause the system to track a livestreaming content viewed by a plurality of viewers on respective electronic devices to detect an event occurring within the live program. The system, in response to a detected event in the livestreaming content, receives viewer interaction data from the respective electronic devices associated with the plurality of viewers. The viewer interaction data includes viewer responses of the plurality of viewers in response to the detected event. The system aggregates the viewer interaction data received from the plurality of viewers. The system synthesizes a cheering audio in relation to the detected event based, at least in part, on the aggregated viewer interaction data. The system generates an enriched livestreaming content based on the livestreaming content and the cheering audio. The system facilitates playback of the enriched livestreaming content on the respective electronic devices for the plurality of viewers, wherein the enriched livestreaming content is configured to simulate an experience of attending the live program for the plurality of viewers.

In another embodiment of the invention, a computer-implemented method for simulating experience of attending a live program for viewers of livestreaming content associated with the live program is disclosed. The method tracks, by a system, a livestreaming content viewed by a plurality of viewers on respective electronic devices to detect an event occurring within the live program. The method, in response to a detected event in the livestreaming content, receives, by the system, viewer interaction data from the respective electronic devices associated with the plurality of viewers. The viewer interaction data includes viewer responses of the plurality of viewers in response to the detected event. The method aggregates, by the system, the viewer interaction data received from the plurality of viewers to generate a set of viewer response categories. The method selects, by the system, one or more chants corresponding to each viewer response category of the set of viewer response categories from a chant repository. The method synthesizes, by the system, a cheering audio in relation to the detected event based, at least in part, on the one or more chants. The method generates, by the system, an enriched livestreaming content based on the livestreaming content and the cheering audio. The method facilitates, by the system, playback of the enriched livestreaming content on the respective electronic devices for the plurality of viewers, wherein the enriched livestreaming content is configured to simulate an experience of attending the live program for the plurality of viewers.

BRIEF DESCRIPTION OF THE FIGURES

The advantages and features of the invention will become better understood with reference to the detailed description taken in conjunction with the accompanying drawings, wherein like elements are identified with like symbols, and in which.

The drawings referred to in this description are not to be understood as being drawn to scale except if specifically noted, and such drawings are only exemplary in nature.

DETAILED DESCRIPTION

The best and other modes for carrying out the present invention are presented in terms of the embodiments, herein depicted in FIGS. 1 to 8. The embodiments are described herein for illustrative purposes and are subject to many variations. It is understood that various omissions and substitutions of equivalents are contemplated as circumstances may suggest or render expedient but are intended to cover the application or implementation without departing from the spirit or scope of the invention. Further, it is to be understood that the phraseology and terminology employed herein are for the purpose of the description and should not be regarded as limiting. Any heading utilized within this description is for convenience only and has no legal or limiting effect.

The terms "a" and "an" herein do not denote a limitation of quantity, but rather denote the presence of at least one of the referenced items.

Figure 1:
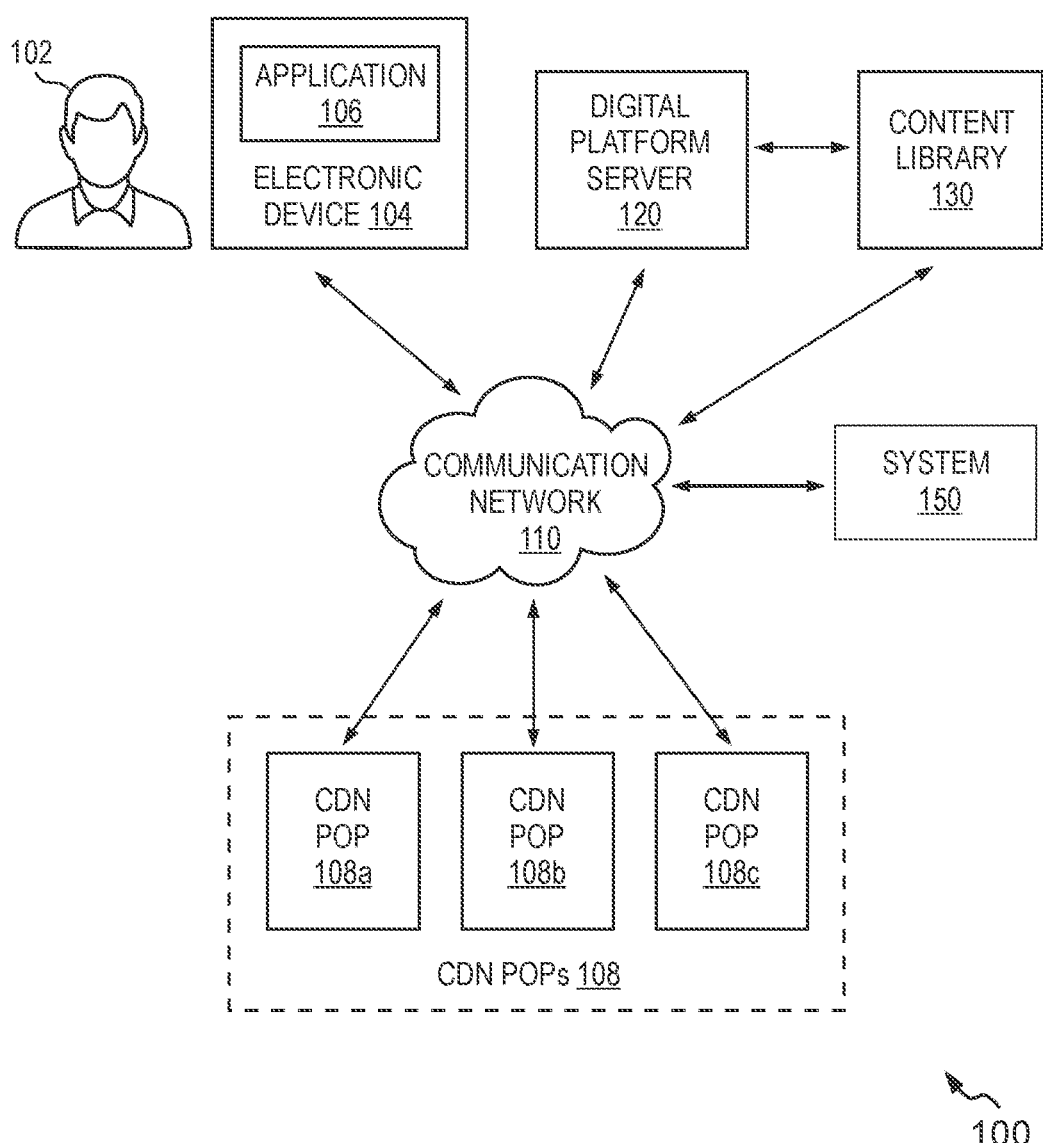
FIG. 1 is an example representation of an environment related to at least some example embodiments of the invention.

FIG. 1 is an example representation 100 of an environment related to at least some example embodiments of the invention. The example representation 100 depicts a viewer 102 controlling an electronic device 104 for viewing/accessing content offered by a streaming content provider.

The term 'streaming content provider' as used herein refers to an enterprise owner of digital video content libraries, which offers video content on a subscription basis by using a digital platform and over-the-top (OTT) media services, i.e. the video content is streamed over the Internet to the electronic devices of the subscribers. A streaming content provider is hereinafter referred to as a 'content provider' for ease of description. Though a content provider is not shown in FIG. 1, a digital platform server 120 and a content library 130 associated with the content provider are shown in the example representation 100 and explained in further detail later.

The content offered by the content provider may be embodied as streaming video content such as livestreaming content or on-demand video streaming content. Individuals wishing to view/access the content may subscribe to at least one type of subscription, such as a regular subscription or a premium subscription, offered by the content provider. Accordingly, the terms 'subscriber', 'user', 'content viewer', or simply 'viewer' as interchangeably used herein may refer to a viewer 102 of subscribed content, which is offered by the content provider.

The viewer 102 may have downloaded a software application 106 (hereinafter referred to as an 'application 106' or an 'app 106') corresponding to at least one content provider on the electronic device 104. The electronic device 104 is depicted to be a Television (TV) for illustration purposes. It is noted that the viewer 102 may use one or more electronic devices, such as a smartphone, a laptop, a desktop, a personal computer, or any spatial computing device to view the content provided by the content provider. In one illustrative example, the viewer 102 may access a Web interface associated with the application 106 associated with a content provider on the electronic device 104. It is understood that the electronic device 104 may be in operative communication with a communication network 110, such as the Internet, enabled by a network provider, also known as an Internet Service Provider (ISP). The electronic device 104 may connect to the communication network 110 using a wired network, a wireless network, or a combination of wired and wireless networks. Some non-limiting examples of wired networks may include the Ethernet, the Local Area Network (LAN), a fiber-optic network, and the like. Some non-limiting examples of wireless networks may include the Wireless LAN (WLAN), cellular networks, Bluetooth or ZigBee networks, and the like.

The electronic device 104 may fetch the Web interface associated with the application 106 over the communication network 110 and cause the display of the Web interface on a display screen (not shown) of the electronic device 104. In an illustrative example, the Web interface may display a plurality of content titles corresponding to the content offered by the content provider to its consumers. The content may include livestreaming content (e.g., live concerts, professional sports games, etc.) and non-livestreaming content (e.g., video-on-demand, vlogs, etc.).

In an illustrative example, the viewer 102 may select a content title related to a live program (e.g., a sports match or a musical concert) from among the plurality of content titles displayed on the display screen of the electronic device 104. The selection of the content title may trigger a request for a playback Uniform Resource Locator (URL). The request for the playback URL is sent from the electronic device 104 via the communication network 110 to a digital platform server 120 associated with the content provider. The digital platform server 120 is configured to facilitate the streaming of the digital content to a plurality of viewers, such as the viewer 102.

In at least some embodiments, the digital platform server 120 includes at least one of a Content Management System (CMS) and a User Management System (UMS) for authenticating the viewer 102 and determining if the viewer 102 is entitled to view the requested content. To this effect, the digital platform server 120 may be in operative communication with one or more remote servers, such as an authentication server and an entitlement server. The authentication server and the entitlement server are not shown in FIG. 1. The authentication server may facilitate authentication of viewer account credentials using standard authentication mechanisms, which are not explained herein. The entitlement server may facilitate the determination of the viewer's subscription type (i.e. whether the viewer 102 has subscribed to regular or premium content) and status (i.e. whether the subscription is still active or is expired), which in turn may enable the determination of whether the viewer 102 is entitled to view/access the requested content or not.

The digital platform server 120 then identifies at least one Content Delivery Network (CDN) Point of Presence (PoP) which is in the proximity of the location of the viewer 102. As an illustrative example, three CDN PoPs such as a CDN PoP 108*a*, a CDN PoP 108*b*, and a CDN PoP 108*c*, are depicted to be identified as CDN PoPs in the proximity of the location of the viewer 102 in FIG. 1. It is noted that the requested content may have been cached from the content library 130 of the content provider to the CDN PoPs 108*a*, 108*b*, and 108*c* (collectively, represented as CDN PoPs 108). Further, the digital platform server 120 identifies an optimal CDN PoP from among the plurality of CDN PoPs 108 for serving the viewer 102 with the requested content. The digital platform server 120 is configured to take into account, the location of the viewer, content ID, performance metrics associated with the plurality of CDN PoPs 108*a*, 108*b*, and 108*c*, and one or more routing policies for determining the most optimal CDN for serving the requested content to the viewer 102.

In one illustrative example (not in accordance with example embodiments of the present disclosure), the viewer 102 may be an ardent cricket fan and may be watching livestreaming of a cricket match being conducted at a remote cricket stadium. Although the viewer 102 may be able to witness the celebrations and reactions of the spectators in the stadium in the livestreaming content, the viewer 102 has no way to express his/her expressions or participate in the celebrations. For example, the viewer 102 may not be able to feel the in-stadium experience of unfolding events, such as a player hitting a six or a bowler taking a wicket during the course of the cricket match. As such even though livestreaming content is hugely popular among viewers, such content in its current form fails to sufficiently engage viewers and, in general, fails to simulate the experience of attending a live program for viewers of the livestreaming content.

To overcome the aforementioned drawbacks and provide additional advantages, a system 150 is provided for simulating an experience of attending a live program for viewers (such as the viewer 102) of livestreaming content associated with the live program. The system 150 is configured to receive viewer interaction data from a plurality of viewers (such as the viewer 102) in relation to unfolding events throughout the course of the livestreaming of content. The system 150 also receives video signals of the livestreaming content and real-time event data, such as a live audio feed from an event venue. The system 150 is configured to generate a cheering audio based on the viewer interaction data and the real-time event data. Further, the system 150 is configured to combine the cheering audio with the livestreaming content to generate an enriched livestreaming content, which is capable of simulating or digitally recreating the experience of attending a live program for viewers of livestreaming content associated with the live program. The system 150 is explained in further detail with reference to FIG. 2.

Figure 2:
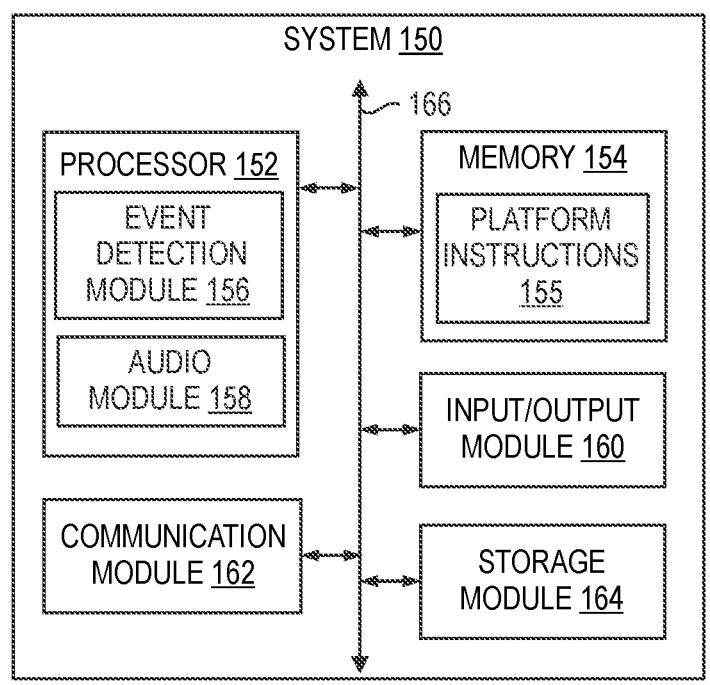
FIG. 2 is a block diagram of a system configured to facilitate simulation of an experience of attending live programs for viewers of livestreaming content, in accordance with an embodiment of the invention.

FIG. 2 is a block diagram of the system 150 configured to facilitate simulation of an experience of attending a live program for viewers of livestreaming content associated with the live program, in accordance with an embodiment of the invention. The system 150 may be implemented in a server accessible over the communication network 110 (shown in FIG. 1). For example, the system 150 may be implemented in one or more computing devices as a part of a server entity and may be in operative communication with the digital platform server 120 (shown in FIG. 1). Alternatively, in at least some embodiments, the system 150 may be implemented within the digital platform server 120.

The system 150 includes at least one processor, such as a processor 152 and a memory 154. It is noted that although the system 150 is depicted to include only one processor, the system 150 may include more number of processors therein. In an embodiment, the memory 154 is capable of storing machine-executable instructions, referred to herein as platform instructions 155. Further, the processor 152 is capable of executing the platform instructions 155. In an embodiment, the processor 152 may be embodied as a multi-core processor, a single-core processor, or a combination of one or more multi-core processors and one or more single-core processors. For example, the processor 152 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application-specific integrated circuit (ASIC), a field-programmable gate array (FPGA), a microcontroller unit (MCU), a hardware accelerator, a special-purpose computer chip, or the like. In an embodiment, the processor 152 may be configured to execute hard-coded functionality. In an embodiment, the processor 152 is embodied as an executor of software instructions, wherein the instructions may specifically configure the processor 152 to perform the algorithms and/or operations described herein when the instructions are executed.

The processor 152 is depicted to include an event detection module 156 and an audio module 158. The event detection module 156 and the audio module 158 may be implemented as hardware, software, firmware, or combinations thereof. The event detection module 156 and the audio module 158 are explained in further detail later.

The memory 154 may be embodied as one or more volatile memory devices, one or more non-volatile memory devices, and/or a combination of one or more volatile memory devices and non-volatile memory devices. For example, the memory 154 may be embodied as semiconductor memories (such as mask ROM, PROM (programmable ROM), EPROM (erasable PROM), flash memory, RAM (random access memory), etc.), magnetic storage devices (such as hard disk drives, floppy disks, magnetic tapes, etc.), optical magnetic storage devices (e.g., magneto-optical disks), CD-ROM (compact disc read-only memory), CD-R (compact disc recordable), CD-R/W (compact disc rewritable), DVD (Digital Versatile Disc) and BD (BLU-RAY® Disc).

In at least some embodiments, the memory 154 stores logic and/or instructions, which may be used by modules of the processor 152, such as the event detection module 156 and the audio module 158. For example, the memory 154 includes instructions for aggregating viewer interaction data received from content viewers in relation to events unfolding in the livestreaming content. The memory 154 further includes logic and/or instructions for selecting one or more chants from a chant repository based on the aggregated viewer interaction data and real-time event data, such as a live audio feed received from event venues. Furthermore, the memory 154 includes instructions for generating a cheering audio, which may then be combined with corresponding audio portions of the livestreaming content to generate an enriched livestreaming content. The enriched livestreaming content is configured to simulate an experience of attending the live program for viewers of the livestreaming content associated with the live program.

The system 150 further includes an input/output module 160 (hereinafter referred to as an 'I/O module 160') and at least one communication module such as a communication module 162. In an embodiment, the I/O module 160 may include mechanisms configured to receive inputs from and provide outputs to the operator(s) of the system 150. To that effect, the I/O module 160 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a display such as a light-emitting diode display, a thin-film transistor (TFT) display, a liquid crystal display, an active-matrix organic light-emitting diode (AMOLED) display, a speaker, a ringer, a vibrator, and the like. In an example embodiment, the processor 152 may include I/O circuitry configured to control at least some functions of one or more elements of the I/O module 160, such as, for example, a speaker, a microphone, a display, and/or the like. The processor 152 and/or the I/O circuitry may be configured to control one or more functions of the one or more elements of the I/O module 160 through computer program instructions, for example, software and/or firmware, stored on a memory, for example, the memory 154, and/or the like, accessible to the processor 152.

The communication module 162 may include communication circuitry such as for example, a transceiver circuitry including an antenna and other communication media interfaces to connect to a communication network, such as the communication network 110 shown in FIG. 1. The communication circuitry may, in at least some example embodiments, enable reception of: (1) livestreaming content from remote entities, such as the content library 130 (shown in FIG. 1) or from the live program venues, (2) viewer interaction data from a plurality of viewers, and (3) real-time event data such as an audio feed of a live program directly from an event venue. The communication circuitry may further be configured to enable transmission of enriched livestreaming content to the CDN PoPs 108 or directly to the subscribers (e.g., the viewer 102).

The system 150 is further depicted to include a storage module 164. The storage module 164 is any computer-operated hardware suitable for storing and/or retrieving data. In one embodiment, the storage module 164 includes a chant repository (shown as chant repository 310 in FIG. 3), which is configured to store a large variety of pre-recorded chants associated with live program. In one illustrative example, a chant in response to a great singing performance may be 'ONCE MORE! WE WANT ONCE MORE!'. In another illustrative example, a chant corresponding to a football game involving soccer star 'Lionel Messi' may be 'MESSSSIII, WE WANT GOAL! !'. In yet another illustrative example, a chant corresponding to an Opera concert may be 'BRAVO!' followed by a clapping sound. As such, the chant repository may include a plurality of pre-recorded chants for a variety of expressions and sounds related to different incidents in live programs related to professional sports games, individual or group live performances (e.g., theatre, music, dance, radio, etc.), entertainment shows, etc., that may be streamed in real-time. In an embodiment, a chant corresponds to an audio signal related to the expression voiced by a human spectator at an event venue in response to the occurrence of the detected event. The storage module 164 may include multiple storage units such as hard drives and/or solid-state drives in a redundant array of inexpensive disks (RAID) configuration. In some embodiments, the storage module 164 may include a storage area network (SAN) and/or a network-attached storage (NAS) system. In one embodiment, the storage module 164 may correspond to a distributed storage system, wherein the individual databases are configured to store custom information, such as viewer interaction data logs for various livestreaming content.

In some embodiments, the processor 152 and/or other components of the processor 152 may access the storage module 164 using a storage interface (not shown in FIG. 2). The storage interface may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 152 and/or the modules of the processor 152 with access to the storage module 164.

The various components of the system 150, such as the processor 152, the memory 154, the I/O module 160, the communication module 162, and the storage module 164 are configured to communicate with each other via or through a centralized circuit system 166. The centralized circuit system 166 may be various devices configured to, among other things, provide or enable communication between the components of the system 150. In certain embodiments, the centralized circuit system 166 may be a central printed circuit board (PCB) such as a motherboard, a main board, a system board, or a logic board. The centralized circuit system 166 may also, or alternatively, include other printed circuit assemblies (PCAs) or communication channel media.

In at least one embodiment, the communication module 162 is configured to receive video signals corresponding to a livestreaming content (i.e., real-time event broadcast). For example, the communication module 162 may receive video signals corresponding to a live program such as a musical concert, i.e., a real-time video feed of a live musical performance conducted at an event venue. The communication module 162 may be configured to forward the video signals to the processor 152. The modules of the processor 152 in conjunction with the instructions stored in the memory 154 may be configured to process the video signals to generate the enriched livestreaming content as will be explained in further detail later.

In at least one example embodiment, the communication module 162 is configured to receive interaction data from electronic devices used by viewers for watching a livestreaming event. Such interaction data received from individual viewers is referred to as 'viewer interaction data'. In at least some example embodiments, the application associated with the content provider (shown as application 106 in FIG. 1) may provide a plurality of options to viewers to select emoticons, animated images, and/or input messages such as text messages or audio/video messages to express/share their emotions in relation to various unfolding events/incidents unfolding throughout the course of the live program. Such viewer inputs may be captured as viewer interaction data and received by the communication module 162 of the system 150. In some embodiments, viewers may provide their reactions/expressions to unfolding events/incidents using gestures (i.e., hand movements, facial expressions, etc.), voice inputs (e.g., hooting, screaming, jeering, slogans, etc.), body movements (e.g., dancing celebrations, mimicking player actions, etc.), and the like. Such viewer information may also be captured and provided to the communication module 162 as the viewer interaction data.

In addition to receiving the video signals corresponding to the livestreaming content and the viewer interaction data corresponding to a plurality of content viewers, the communication module 162 may also receive audio inputs from the venue of the live program. Such audio inputs from the event venue may be captured using a plurality of sensors deployed at multiple locations within the event venue to capture a live audio feed from the venue of the live program. In at least some embodiments, the audio inputs from the venue may capture spectator chants and slogans among other sounds associated with the hosting of the live program at the venue.

In one embodiment, the event detection module 156 in conjunction with the instructions in the memory 154 is configured to detect events (or incidents of interest) in the livestreaming content. In one illustrative example, the event detection module 156 may include a learning algorithm trained to analyze the livestreaming content and interpret unfolding events in the livestreaming content. The event during the livestreaming content may include a variety of different types. For instance, in an example, the event may be predetermined. For example, during a pre-recorded livestreaming content, the event detection module 156 is configured to generate an event feature that may determine at which points during the livestreaming content, an event should occur. In another example, the event may be determined as a function of criteria that indicates an event occurrence. For example, the event detection module 156 may be capable of detecting a penalty kick ordered by a referee during a football match. In another illustrative example, the event detection module 156 is capable of detecting the completion of a performance related to a song during a musical concert. In yet another illustrative example, the event detection module 156 is capable of detecting a four, a six, or a wicket during a cricket match. To that effect, the learning algorithm may be trained to analyze scorecards, player expressions, and/or spectator reactions to detect the occurrence of an event in the livestreaming content. It is noted that the term 'event' or an 'incident' within the livestreaming content may not be limited to occurrences within a live program, which are interesting to viewers. In some cases, there may be time passages within a live program, which do not involve any interesting parts, for example, a passage in a football match when both teams are playing a defensive game, or, a part in a musical event, when relatively unpopular songs are being played. Such time passages may also lead viewers to express their emotions, such as 'bored', 'anxiety to see a change', etc., which in turn may also be detected by the event detection module 156 based on the viewer interaction data received from the plurality of content viewers.

In at least one embodiment, the event detection module 156 is configured to provide a signal to the audio module 158 on detecting an occurrence of an event in the livestreaming content. The audio module 158 is also configured to receive inputs related to the viewer interaction data, real-time event data, and the video signals corresponding to the livestreaming content. The audio module 158 is configured to initiate the processing of these inputs in response to the signal provided by the event detection module 156. The processing performed by the audio module 158 is explained next with reference to FIG. 3.

Figure 3:
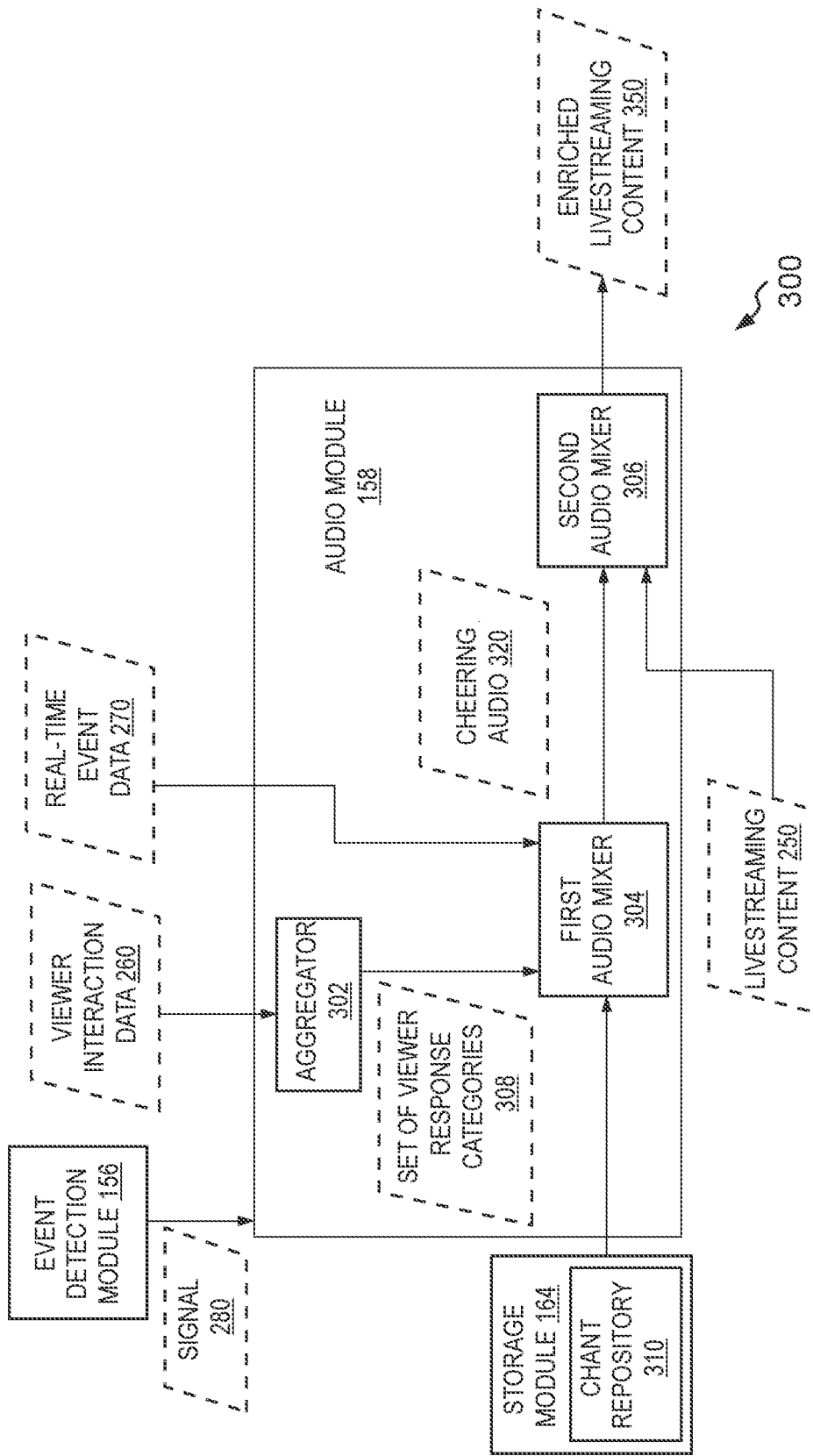
FIG. 3 is a block diagram of an audio module for illustrating a processing performed by the audio module to facilitate simulation of the experience of attending live programs for content viewers, in accordance with an embodiment of the invention.

FIG. 3 is a block diagram 300 of the audio module 158 for illustrating a processing performed by the audio module 158 to facilitate simulation of the experience of attending a live program for content viewers, in accordance with an embodiment of the invention. As explained with reference to FIG. 2, the communication module 162 may receive video signals corresponding to the livestreaming content, real-time event data (i.e., a live audio feed from the event venue), and viewer interaction data from a plurality of viewers. The communication module 162 is configured to forward the received signals/information to the processor 152 (shown in FIG. 2). Further, the event detection module 156 and the audio module 158 of the processor 152 are configured to receive these inputs. Accordingly, in FIG. 3, the audio module 158 is depicted to receive livestreaming content 250, viewer interaction data 260, and real-time event data 270 as inputs.

The audio module 158 is depicted to include an aggregator 302, a first audio mixer 304, and a second audio mixer 306. As explained with reference to FIG. 2, the event detection module 156 is configured to provide a signal (shown as signal 280 in FIG. 3) to the audio module 158 on detecting the occurrence of an event (or an incident) in the livestreaming content 250. The aggregator 302 is configured to collate viewer interaction data 260 received from a plurality of viewers for a predefined time to generate a set of viewer response categories 308, in response to the reception of the signal 280 from the event detection module 156.

In at least some embodiments, an application (such as the application 106) provided by the content provider may display options on a user interface (UI) widget on respective electronic devices associated with a plurality of viewers. The plurality of options prompts the viewers to share viewer responses (i.e., emotions/expressions) in response to events unfolding during a live program. Each viewer of the plurality of viewers may select an option, which best captures the viewer's emotion from the UI widget, and additionally may also provide other inputs, such as a hand/facial gesture, an audio input, a video input, or a message in response to an event that occurred during the live program. The options and/or the inputs provided by the plurality of viewers may be captured by the application such as, the application 106 installed in the respective electronic devices of the plurality of viewers as viewer interaction data 260 and forwarded to the system 150 (shown in FIG. 2).

In an illustrative example, a viewer may be watching a live football game and an event corresponding to a player performing an unfair act resulting in the referee calling a foul and awarding a penalty kick may have occurred during the game. An example set of options provided to the viewer for sharing expressions related to such an event is shown in FIG. 4.

Figure 4:
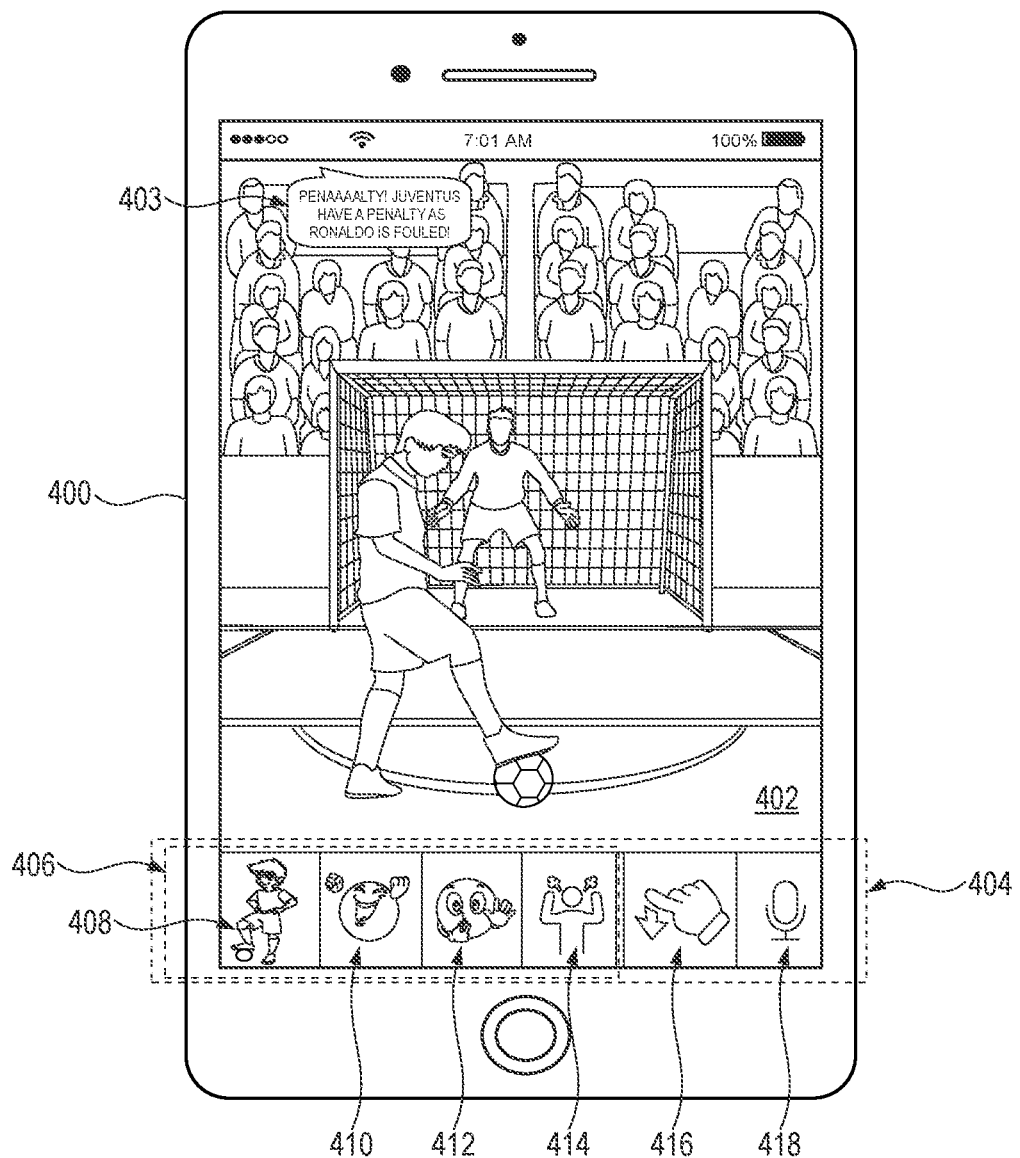
FIG. 4 shows an electronic device displaying a UI corresponding to a live football game for illustrating the generation of viewer interaction data, in accordance with an embodiment of the invention.

Referring now to FIG. 4, an electronic device 400 displaying a UI 402 corresponding to a live football game for illustrating the generation of viewer interaction data, is shown, in accordance with an embodiment of the invention. As explained with reference to FIG. 3, an event of awarding a penalty kick may have occurred during the live football game. Accordingly, in FIG. 4, the UI 402 is depicted to display livestreaming content corresponding to the football game. The livestreaming content may be associated with audio, such as live commentary, in relation to the football game. Accordingly, the UI 402 is exemplarily depicted to show a speech bubble 403 corresponding to a voice input of a commentator. As an example, the speech bubble 403 is exemplarily depicted to be associated with the text 'PENAAAALTY! JUVENTUS HAVE A PENALTY AS RONALDO IS FOULED!' corresponding to a voice input of a commentator. It is noted that the audio associated with the livestreaming content may not be limited to the textual content shown in the speech bubble 403, or even, audio commentary associated with the football game. For instance, the audio associated with the livestreaming content may include other sounds heard in a stadium where the soccer match is played such as, but not limited to, spectator cheering sounds, player voices, referee announcements, etc.

An application (not shown in FIG. 4) of the content provider installed in the electronic device 400 which is facilitating livestreaming of the content related to the football game and, in turn, facilitating the display of the UI 402, may be configured to display options to the viewer (not shown in FIG. 4) to express emotions in relation to events unfolding during the football game. To this effect, the application may cause the display of a widget 404 including several options for the viewer to express his emotion in relation to the event that occurred during the football game. The widget 404 is depicted to include a plurality of options for the viewer. In some embodiments, the widget 404 may be a dynamic widget, wherein the options displayed on the widget 404 may change or adapt to the unfolding events during the football game. Alternatively, in some embodiments, the widget 404 may be a floating widget, which may appear only when an event or an incident is detected to have occurred (for example, an event related to a foul resulting in a penalty kick) during the live program. Further, the widget 404 may disappear as soon as the event is over. In other words, the widget 404 is provided for a predefined time after the event occurrence.

As an example, the viewer is depicted to have been provided with a plurality of selectable icons 406, an option 416 for gesture input, and an option 418 for voice input on the widget 404. The plurality of selectable icons 406 is further depicted to include emoticons 408, 410, 412, and 414 as representative of various emotions, reactions, and/or expressions related to the event. For example, the emoticon 408 represents a penalty kick event, the emoticon 410 represents 'celebration', the emoticon 412 represents 'hooting', and the emoticon 414 represents 'frustration'. The viewer can click on the emoticon 408 if he wants to cheer for the player when he takes on the penalty click. If the viewer is excited about the team getting a penalty kick, the viewer can provide a touch/click input on the emoticon 410 as well. Further, the viewer may want to hoot to express his happiness/excitement in response to the detected event (i.e., the awarding of a penalty kick). As such, the viewer can provide a touch/click input on the emoticon 412. On the contrary, if the viewer supports the opponent team, the viewer can express his frustration by providing a touch/click input on the emoticon 414.

When the viewer provides a touch/click input on the option 416, the viewer can provide a gesture input, for example, move one hand pointing up to indicate that the penalty will result in a goal. In some example embodiments, clicking on the option 416 causes the display of a guidebook depicting a series of gestures related to the detected event. As such, the viewer may perform a relevant gesture that can be processed to recognize the viewer's response (i.e., expression/reaction) in response to the event.

The viewer may also provide a click/touch input on the option 418 and speak into a microphone of the electronic device 400 to provide a voice input that may express his reaction to the event. For example, the viewer may speak the following chant "FORZA JUVE" (i.e., GO FOR IT).

It is noted that the viewer can provide more than one viewer response (i.e., expression/reaction) for the detected event within the predefined time. In one illustrative example, the viewer may provide a selection input on more than one selectable icons. In another illustrative example, the viewer may provide a voice input and a selection input on a selectable icon from among the plurality of selectable icons 406. In general, the viewer can express his reaction to the detected event in several ways within the predefined time.

It is noted that the icons/options displayed on the widget 404 on the UI 402 are shown herein for illustration purposes. In some embodiments, the options/icons displayed on the widget 404 may be incident-specific (i.e., related to the incident) or specific to the live program. For example, the UI 402 may display different icons or options related to other detected events, such as a team scoring a goal, a substitution of a player, an injury to a star player, etc., in the football game. Similarly, for a different live program, such as a musical concert or a different sports game, the widget 404 may include a different set of icons and options for the content viewer to express/share his emotions. Further, the use of emoticons, voice input, and gesture input as forms for providing expressions may also be customized as per the viewer, live program, or the incident. For example, other forms of expressions, such as text messaging options, selectable Graphics Interchange Format (GIFs), selectable chants or cheering sounds, video uploading options, etc., which are capable of enabling the viewer to express his or her reaction to any detected event, may also be provided on the widget 404 to enhance a viewing experience of the viewer. In at least some embodiments, such selections provided by a plurality of viewers are captured by the application of the content provider as 'viewer interaction data' and provided to the system 150.

Referring back to FIG. 3, in at least one embodiment, the aggregator 302 is configured to aggregate the viewer interaction data 260 corresponding to each viewer, in response to the signal 280 received from the event detection module 156. Consider the example explained with reference to FIG. 4, the penalty kick awarded to one team may be cheered by the team's supporters. However, viewers who support the opponent's team may be disappointed with the referee's decision. The aggregator 302 may be configured to classify viewer responses (i.e., different reactions or responses) of the plurality of viewers into different categories based on either selection (such as selection of emoticons, voice input, gesture input, etc.) and/or emotions represented by the selections (for example, happy viewer, disappointed viewer, bored viewer, etc.). For example, 200 viewers may have selected an emoticon representative of the 'jeering' emotion at the referee for his decision to award a penalty kick, and around 1000 viewers may have selected an emoticon representative of the 'hooting' emotion or provided a voice input related to a hooting sound, and 500 viewers may have selected an emoticon representative of the 'sigh' emotion or provided gesture inputs related to 'sigh' feeling. As an example, the aggregator 302 may classify such aggregated viewer interaction data into categories associated with emotions 'boo', 'sigh', and 'elation'. The categorization of the viewer interaction data corresponding to the plurality of viewers may generate a set of viewer response categories 308. The set of viewer response categories 308 may be provided to the first audio mixer 304.

The first audio mixer 304 is also configured to receive the real-time event data 270 (i.e., live audio feed from the event venue). In at least one embodiment, the first audio mixer 304 is configured to select the one or more chants from a chant repository 310 in the storage module 164. The term 'chant (or slogan)' as used herein refers to an electronic representation of an audio signal voiced by a human spectator at an event venue in response to the occurrence of an event (or incident) during a live program. In at least one embodiment, the chant repository 310 is configured to serve as a database of chants, where the chants may be specific to live programs, incidents within the live programs, personalities involved in the live programs, and the like. For example, the chant repository 310 may have a plurality of store pre-recorded chants corresponding to a variety of sports games, such as cricket, football, tennis, basketball, golf, badminton, boxing, track and field events, and the like. In another illustrative example, the chant repository 310 may store chants corresponding to a variety of professional sports teams (both national and local teams) and players within the professional sports team. In yet another illustrative example, the chant repository 310 may store pre-recorded chants corresponding to live shows related to theatre, music, dance, and/or even reality shows.

The first audio mixer 304 is configured to use the real-time event data 270 and the set of viewer response categories 308 to select an appropriate chant from the chant repository 310. In an illustrative example, if an overwhelming number of viewer responses in the set of viewer response categories 308 corresponds to a hooting (or a cheerful) response in response to the fall of a wicket in a cricket game, and if the real-time event data 270 also includes a variety of hooting sounds, then the first audio mixer 304 is configured to traverse a hierarchy of sub-repositories to select an appropriate hooting chant from the chant repository 310. For example, the first audio mixer 304 may first identify a first layer sub-repository (not shown in FIG. 3) within the chant repository 310, which corresponds to a cricket game, followed by a lower second level sub-repository corresponding to an event (such as the fall of wicket, for example) and a third level sub-repository corresponding to the hooting sound in response to the fall of a wicket. Further, the first audio mixer 304 may also select additional chants related to sighing and booing from the chant repository 310. It is noted that selected chants are embodied as digital representations of audio signals representing the voiced chants by the spectators.

In at least one embodiment, the first audio mixer 304 and the second audio mixer 306 are capable of performing audio mixing, i.e. adjusting and combining (or blending) multiple audio signals into single audio. During audio mixing, one or more audio parameters (i.e., volume level, frequency, etc.) of the audio signals are manipulated or enhanced to generate the single audio. In one embodiment, a count value of viewer responses in each viewer response category is determined from the aggregated viewer interaction data to adapt the intensity (i.e., volume level) of an audio signal corresponding to a respective chant. More specifically, the intensity of cheering (e.g., hooting) depends on the number of viewers, who have provided a hooting reaction in response to the detected event.

In one illustrative example, if a basketball player performs a jump shot to shoot and hurts an opponent badly in the process (i.e., an event in the livestreaming content 250), most viewers (e.g., 2000 viewers) may provide viewer responses corresponding to a 'sigh' emotion and some viewers (e.g., 100 viewers) may provide viewer responses indicating encouragement to cheer the hurt player. Accordingly, volume levels of an audio signal corresponding to a sighing sound may be increased to depict a higher intensity relative to an audio signal "GO JOHN! GO JOHN! GO! GO! GO!" expressing encouragement to the hurt player, which is then mixed at lower decibels.

Accordingly, in one embodiment, the first audio mixer 304 may be configured to audio-mix or combine the audio signals corresponding to one or more selected chants with a corresponding portion of the live audio feed from the real-time event data 270 to configure a cheering audio 320. Alternatively, in some embodiments, the audio signals corresponding to one or more chants may be output from the first audio mixer 304 as the cheering audio 320. In at least some embodiments, the cheering audio 320 may include chants expressing happiness, joy, or elation along with support or encouragement to a performer, a player, or a team. In some example embodiments, the cheering audio 320 may also include other human reactions or expressions that convey despair, frustration, sorrow, displeasure, and the like, in response to a detected event. In one illustrative example, if the viewer is watching a live theatrical performance depicting a tragedy, the reactions from most viewers may indicate 'sorrow'. Accordingly, the cheering audio 320 may include sobbing, sadness and despair related sounds. In at least one embodiment, the cheering audio 320 is provided to the second audio mixer 306 by the first audio mixer 304.

The second audio mixer 306 is configured to receive the cheering audio 320 from the first audio mixer 304 and the livestreaming content 250 from the communication module 162 (shown in FIG. 2). The second audio mixer 306 is configured to combine the livestreaming content 250 with the cheering audio 320, such that the cheering audio serves as a background sound of the livestreaming content 250. More specifically, the livestreaming content 250 may include original audio such as but not limited to live commentary, live spectator sounds, cheering sounds and/or sound of players' voices in a professional sports game, and/or the sound of musical instruments, live performers' voices, and the audience cheering sounds in live performances. Such original audio of the livestreaming content 250 is mixed with the cheering audio 320 to generate an enriched livestreaming content 350 for the content viewers. More specifically, the audio module 158 performs audio mixing of the cheering audio 320 with the corresponding audio portion of the livestreaming content 250 in substantially real-time to generate the enriched livestreaming content 350 that is configured to simulate the experience of attending a live program for the viewers of the livestreaming content. For example, suppose, 1.5 million viewers are viewing a livestreaming content of a cricket game on their electronic devices and a batsman hits a SIX runs in the cricket game at time $T=T_1$. According to the present invention, in response to event occurrence (e.g., hitting the SIX), the system may prompt the viewers to provide viewer interaction data in relation to the event within a predefined time duration (e.g., $T_1+3$ seconds). The system processes the viewer interaction data that is received from the viewers within the predefined time duration and synthesizes cheering audio in relation to the event based on the viewer interaction data. In one scenario, the system performs all the processes within a processing time (e.g., 0.35 seconds) or near real-time. Thereafter, the system generates an enriched livestreaming content by combining the cheering audio with a live audio feed of the livestreaming content associated with a particular timestamp (e.g., $T_1+3+$processing time). Thus, the cheering audio is combined with the livestreaming content with a threshold delay after the event occurrence. Further, a time length of the cheering audio may be equal to a predetermined value (e.g., 5 seconds).

Figure 5:
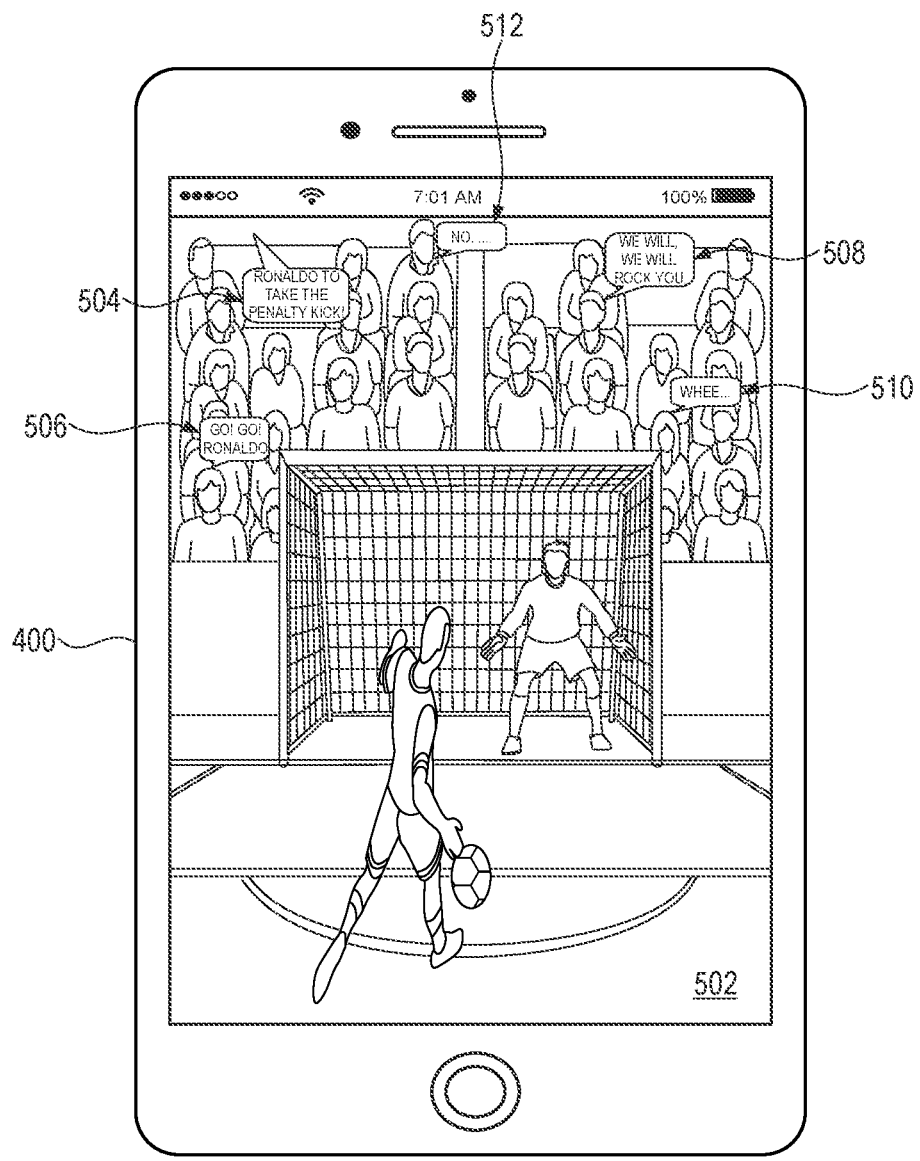
FIG. 5 shows an electronic device displaying a UI of an enriched livestreaming content corresponding to alive football game, in accordance with an embodiment of the invention.

FIG. 5 shows the electronic device 400 of FIG. 4 displaying a UI 502 of an enriched livestreaming content corresponding to a live football game, in accordance with an embodiment of the invention. As explained with reference to FIG. 3, the livestreaming content is enriched with a cheering audio to generate an enriched livestreaming content. Accordingly, the UI 502 displays the video associated with livestreaming content and is associated with an audio signal which in addition to the original audio of the livestreaming content also includes a cheering audio that includes one or more chants, capable of mimicking the feeling of being present at the event venue. The original audio of the livestreaming content may include live commentary, as shown in a speech bubble 504. For example, a voice input of a commentator of the soccer match is shown in the speech bubble 504 as "RONALDO TO TAKE THE PENALTY KICK!".

Further, as explained with reference to FIG. 3, the viewer responses from a plurality of viewers (i.e., viewer interaction data) in response to a detected event (such as awarding of a penalty kick) are collated for the predefined time to generate the aggregated viewer interaction data. The aggregated viewer interaction data is classified into a set of viewer response categories. The set of viewer response categories facilitates selection of one or more chants which in addition to the real-time event data (i.e. the live audio feed from the event venue) are configured to facilitate the generation of a cheering audio, such as the cheering audio 320 explained with reference to FIG. 3. The cheering audio is combined with the livestreaming content to generate the enriched livestreaming content, which may include a plurality of UIs, such as the UI 502. Further, as explained with reference to FIG. 3, an intensity (i.e., volume level) of the audio signal corresponding to various chants configuring the cheering audio may be adapted based on the count value (i.e., number of viewer responses) associated with each viewer response category.

In one illustrative example, 1000 viewers may have cheered for the player taking the penalty kick (e.g., by clicking on the emoticon 408 in FIG. 4), 500 viewers may have expressed celebration by clicking on an emoticon depicting celebration (e.g., by clicking on the emoticon 410 in FIG. 4), 3000 viewers may have hooted (e.g., by clicking on the emoticon 412 or via the option 418 for voice input) when the penalty kick was given to the player, and 2000 viewers may have expressed 'frustration' over the umpire's decision to award a penalty kick to the team. Accordingly, an audio signal corresponding to cheering the player (i.e., Ronaldo) is depicted in speech bubble 506 as "GO! GO! RONALDO", an audio signal corresponding to celebrating the penalty kick is depicted in the speech bubble 508 as "WE WILL, WE WILL ROCK YOU", an audio signal corresponding to hooting is depicted in speech bubble 510 as "WHEEE . . . " and an audio signal corresponding to frustration is depicted in a speech bubble 512 as "NO . . . ". It shall be noted that the viewer selectable emoticons 408, 410, and 412, and the emoticon 414 shown in FIG. 4 have been used for example purposes and the viewer expressions provided via voice, gesture, or text inputs may also be processed and collated for determining the cheering audio.

Such an enriched livestreaming content provides a stadium-like feeling, at least in terms, of sounds experienced at the event venue, and thereby simulates the experience of attending a live program for viewers of live streaming content. In particular, the system synthesizes the cheering audio, audio-mixes the cheering audio with the livestreaming content in substantially real-time, and plays back for the viewers. A method for facilitating simulation of the experience of attending a live program for viewers of livestreaming content is explained with reference to FIG. 6.

Figure 6:
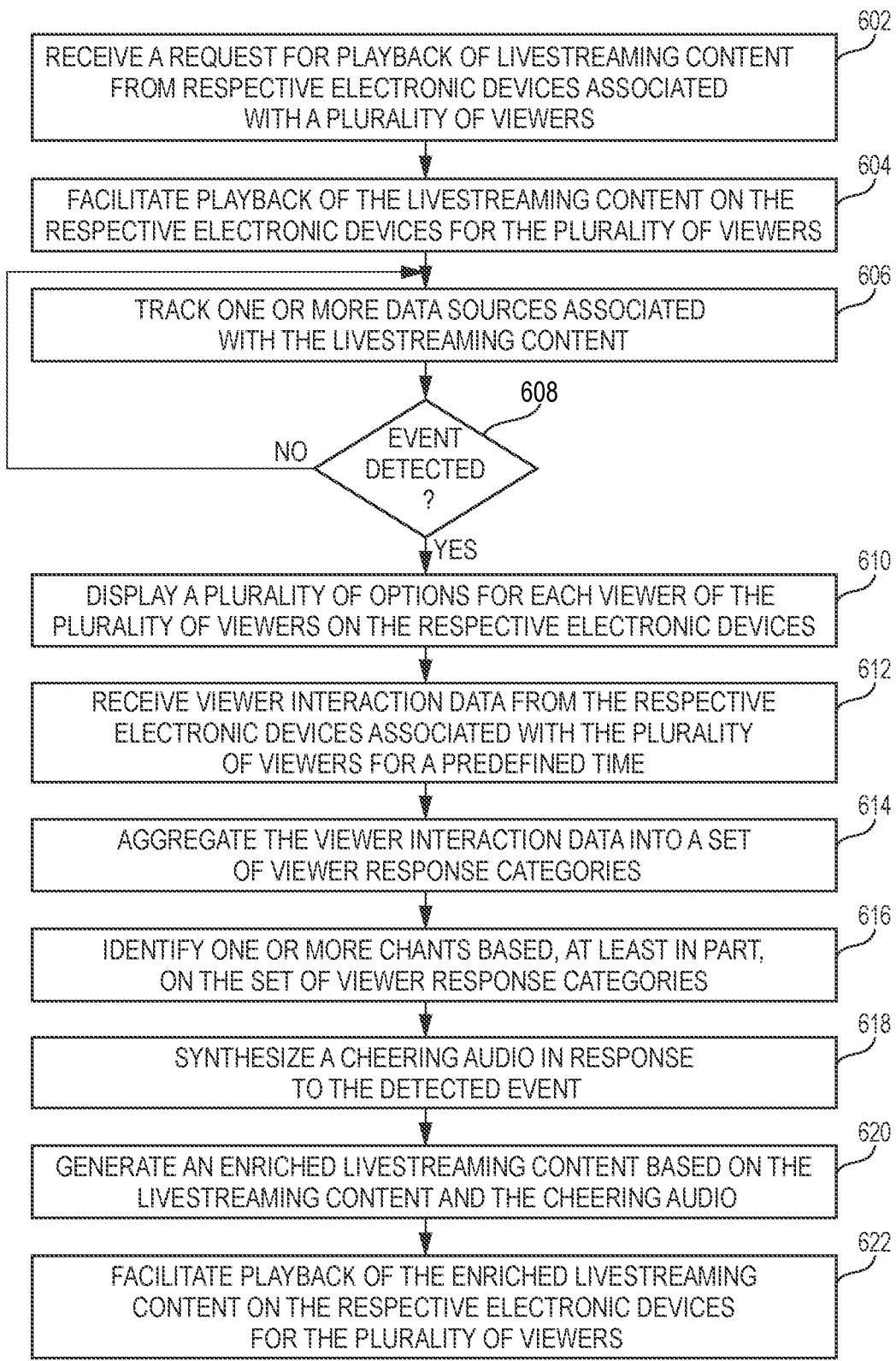
FIG. 6 shows a flow diagram of a method for facilitating simulation of an experience of attending a live program for viewers of livestreaming content, in accordance with an embodiment of the invention.

FIG. 6 shows a flow diagram of a method for facilitating simulation of an experience of attending a live program for viewers of livestreaming content, in accordance with an embodiment of the invention. The method 600 starts at operation 602.

At operation 602 of the method 600, a request for playback of livestreaming content is received from respective electronic devices associated with a plurality of viewers by a system such as, the system 150 explained with reference to FIGS. 1-5. For example, a viewer (e.g., viewer 102) may select a livestreaming content associated with a content title among a plurality of content titles displayed on a display screen of the electronic device which triggers the request for the playback of the livestreaming content.

At operation 604 of the method 600, the system 150 facilitates playback of the livestreaming content. More specifically, the digital platform server 120 authenticates the viewer and determines if the content viewer is entitled to view the livestreaming content. On account of being operably coupled with the digital platform server 120, the system 150 facilitates playback of the livestreaming content for the content viewer after authenticating the identity of the content viewer.

At operation 606 of the method 600, data sources associated with the livestreaming content are monitored. Some examples of the data sources include, but are not limited to, scorecards, audio signals, video signals, and the like related to the livestreaming content. These data sources are analyzed for detecting one or more events in the livestreaming content.

At operation 608 of the method 600, the system 150 checks for events in the livestreaming content. In general, the data sources reflect any change in the livestreaming content, and any such changes in the livestreaming content are identified as an event. In one illustrative example, when a player scores a goal in a game of soccer, the commentator may loudly exclaim 'GOAAAAALL' in a high pitch tone which is detected as an event based on the change in an audio signal. In another illustrative example, a set of spectators is seen waving flags and cheering a team, which is detected as an event from the video signal. In yet another illustrative example, a batsman may not hit boundaries in the middle overs of a One Day International (ODI) cricket match, and as such spectators may be bored as determined by the video signals. As such, such instances may also be detected as an event based on the data sources. If an event is detected operation 610 is performed. Alternatively, when no event is detected, the system 150 continuously monitors the livestreaming content till an event is detected.

At operation 610 of the method 600, a plurality of options is displayed for each viewer of the plurality of viewers on the respective electronic devices. The plurality of options is displayed on a UI such as, the UI 402 (shown in FIG. 4) for a predefined time. In general, the plurality of options prompts the plurality of viewers to share their expressions in response to the detected event. An example of options displayed for the viewer on detecting an event is shown and explained with reference to FIG. 4.

At operation 612 of the method 600, viewer interaction data is received from the respective electronic devices associated with the plurality of viewers for a predefined time. More specifically, the plurality of options corresponds to selectable emoticons, selectable animated images, text messages, audio messages, video messages, gestures, body movements, and the like. As such, each viewer may select at least one option from among the plurality of options to provide their responses (i.e., emotions/expressions) in relation to the detected event. The viewers may share their viewer responses by providing selection input on any option of the plurality of options. In one illustrative example, the viewer may provide a voice input using an option (e.g., option 418 shown in FIG. 4) among the plurality of options. In another illustrative example, the content viewer may provide a selection input on a selectable icon such as, the emoticon 412 (shown in FIG. 4). Such viewer responses received from the plurality of viewers are referred to as the viewer interaction data in response to the detected event.

At operation 614 of the method 600, the viewer interaction data received from the plurality of viewers for the predefined time is aggregated into a set of viewer response categories. In general, viewer responses (i.e., emotions/expressions) shared by the plurality of viewers are classified into a set of viewer response categories. Some examples of viewer response categories include, but are not limited to, sigh, boo, cheer, awestruck, disappointment, and the like which may be used by fans to support favorite players or sports teams on the field. In general, the viewer response category defines an expression/emotion expressed by the viewer in response to the event in the livestreaming content. In one illustrative example, the umpire may declare a batsman out for a leg before wicket (lbw) when a ball strikes in line with the wicket during a last-over thriller between two teams (i.e., Team A and Team B). A group of followers of Team A may be dejected on seeing the umpire's decision and may select an option that expresses disappointment. For example, the group of followers may either provide selection input on an emoticon showing disappointment, type in the text indicating disappointment, provide gestures indicating disappointment or provide an audio message indicating disappointment (e.g., Oh . . . Nooooo!). Alternatively, followers of Team B may be thrilled to see their team performing well and as such, some viewers provide selection input on an emoticon indicating celebration, some viewers may provide selection input on an emoticon indicating hooting, some viewers may provide audio input indicating cheering the team B. All such viewer interaction data (i.e., expressions) are collated for the predefined time and classified into different viewer response categories. For example, emoticons indicating celebration, textual inputs indicating celebration, and audio signals indicating celebration are classified as viewer response categories indicating 'elation'. Similarly, emoticons indicating hooting sound and audio inputs with hoot sounds are classified as a viewer response category indicating 'hoot'. Similarly, emoticons, texts, or gestures indicating disappointment are classified as viewer response category indicating 'sadness'. These expression categories (i.e., elation, hoot, sadness) configure a set of viewer response categories in response to the detected event. Accordingly, count values are determined in relation to the set of viewer expressions or set of viewer response categories based on the viewer response of the plurality of viewers. More specifically, a count value indicates the number of viewers who have expressed the same expression (i.e., viewer response) in relation to the event. In other words, a count value for a particular viewer response category is equal to the number of viewer responses classified into the particular viewer response category.

At operation 616 of the method 600, the system 150 identifies at least one or more chants based, at least in part, on the set of viewer response categories. More specifically, the system 150 searches the chant repository (see, chant repository 310 in FIG. 3) to determine at least one chant corresponding to each viewer response category. In other words, the system 150 determines audio signals corresponding to one or more chants. In one illustrative example, a hoot sound is selected as a chant corresponding to the viewer response category labeled with a 'hoot' expression in relation to the detected event. In another illustrative example, a chant Naaaaaaaaaay!' and a chant 'Teaaaaaaaam B! Team B! (clap sound)' may be selected corresponding to the viewer response category indicating 'celebration'.

At operation 618 of the method 600, the system 150 synthesizes a cheering audio in response to the detected event. Audio signals of selected chants corresponding to viewer response categories are combined together by adapting intensity values of audio signals related to the one or more chants based on the count values associated with the corresponding viewer response categories. The count values are utilized to adapt the volume level or intensity of the audio signal corresponding to a selected chant. In one illustrative example, 100 viewers may have cheered a player entering the playing arena, 50 viewers may have hooted to express their happiness and 10 viewers may have booed to express their dissatisfaction with the player. As such, the cheering audio generated may include audio signals of cheering the player (for example, a chant 'DHONIIII . . . DHONI . . . ') with the highest intensity when compared with audio signals indicating booing of some viewers. The live audio feed is received from one or more sensors configured at an event venue associated with the livestreaming content. In general, the cheering audio may be synthesized by mixing audio signals corresponding to the real-time event data and one or more audio signals corresponding to the selected chants. In one embodiment, a time length of the cheering audio may be equal to a predetermined value.

Thus, by synthesizing the cheering audio, the system 150 is configured to convert the viewer interaction data received from the plurality of viewers into an audio format which can be combined with greater accuracy and in a reduced time with a live audio feed of the livestreaming content.

At operation 620 of the method 600, an enriched livestreaming content is generated based on the livestreaming content and the cheering audio. In general, the cheering audio is combined with a corresponding audio portion of the livestreaming content to generate the enriched livestreaming content for the plurality of viewers.

At operation 622 of the method 600, playback of the enriched livestreaming content is facilitated on the respective electronic devices for the plurality of viewers.

Figure 7:
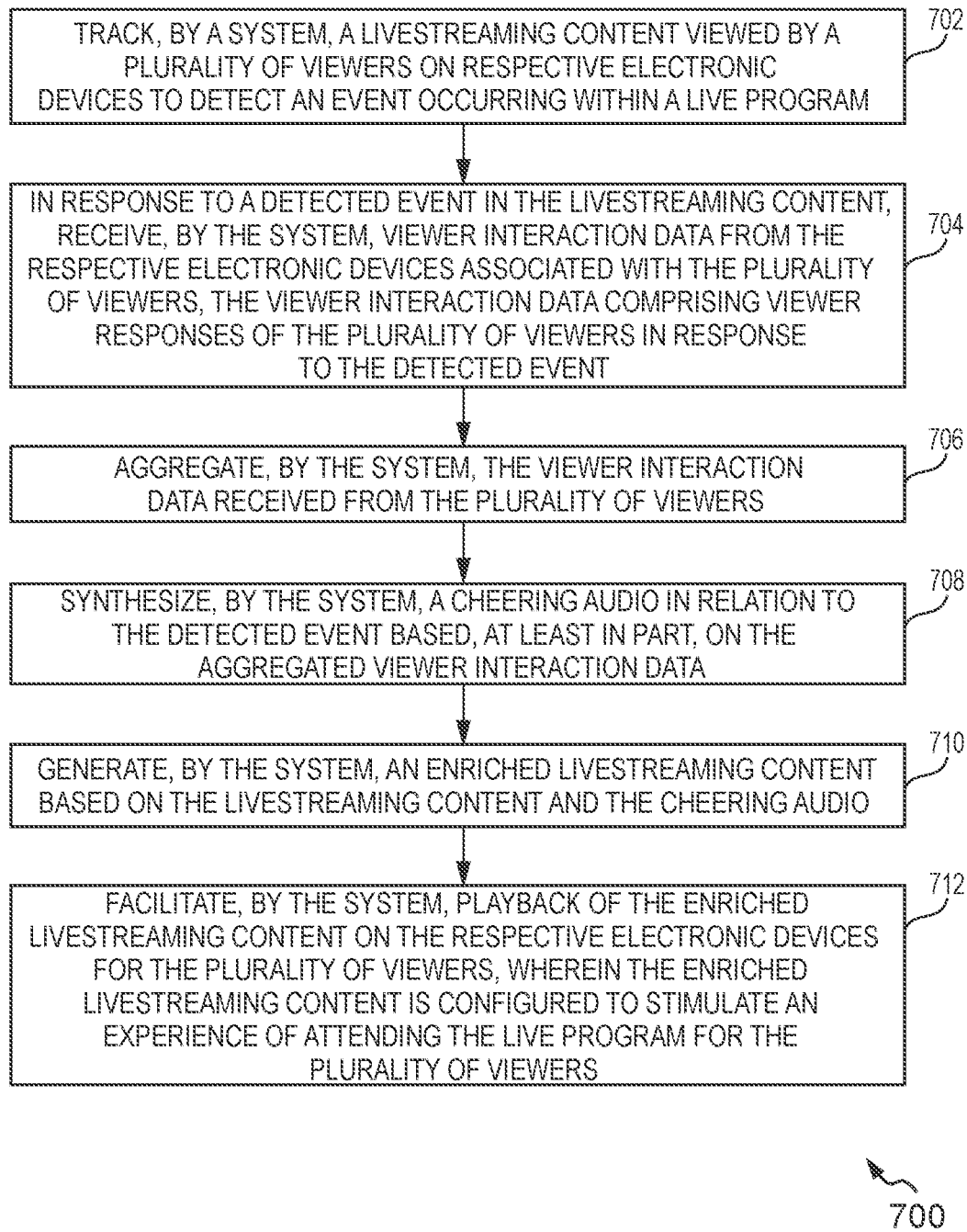
FIG. 7 shows a flow diagram of a method for generating enriched livestreaming content for viewers of livestreaming content, in accordance with an embodiment of the invention.

FIG. 7 shows a flow diagram of a method 700 for facilitating simulation of the experience of attending a live program for viewers of livestreaming content, in accordance with an embodiment of the invention. The various steps and/or operations of the flow diagram, and combinations of steps/operations in the flow diagram, may be implemented by, for example, hardware, firmware, a processor, circuitry, and/or by a system such as the system 150 explained with reference to FIGS. 1 to 6 and/or by a different device associated with the execution of software that includes one or more computer program instructions. The method 700 starts at operation 702.

At operation 702 of the method 700, a livestreaming content viewed by a plurality of viewers on respective electronic devices is tracked by a system such as, the system 150 (explained with reference to FIGS. 1 to 6) to detect an event. In an embodiment, one or more events in the livestreaming content are determined based on an analysis of one or more data sources related to the livestreaming content. Some examples of the one or more data sources include, but are not limited to, a scorecard, video signal, and an audio signal. More specifically, the one or more data sources are analyzed for identifying the occurrence of predefined changes, predefined actions, sudden changes in audio/video intensity, anomalous changes in expected event flow, and the like. An example of an event may be a player scoring a goal in a football match or a singer completing performance of a song or a player taking a wicket in a cricket match, and the like. It is noted that the term 'event' or an 'incident' within a livestreaming content may not be limited to occurrences within a live program, which is interesting to viewers. In some cases, there may be time passages within a live program, which do not involve any interesting parts, such as a passage in a football match when both teams are playing a defensive game, or, a part in a musical event, when relatively unpopular songs are being played. Such incidences or occurrences may also constitute an event.

At operation 704 of the method 700, viewer interaction data is received from the respective electronic devices associated with the plurality of viewers in response to a detected event in the livestreaming content. The viewer interaction data includes viewer responses of the plurality of viewers in response to the detected event. In an embodiment, a plurality of options may be displayed for each viewer on a User Interface (UI) such as, the UI 402 (shown in FIG. 4) of respective electronic devices associated with the plurality of viewers to prompt the plurality of viewers for providing the viewer responses (i.e., share expressions/emotions) in response to the detected event. Some examples of the plurality of options include, but are not limited to, selectable emoticons, selectable animated images, text messages, audio messages, video messages, gestures, and body movements. Moreover, these options are customized and presented on the UI for the plurality of viewers. In one illustrative example, if the event corresponds to a free hit signaled by the umpire, the selectable animated images may correspond to the batsman, the bowler, and the umpire. A selection of the animated image corresponding to the batsman may indicate cheering for the batsman, a selection of the animated image corresponding to the bowler may indicate cheering for the bowler and a selection of the animated image corresponding to the umpire may indicate dissatisfaction/jeering at the umpire. An example of displaying such options for a viewer is shown and explained with reference to FIG. 4. As such, the plurality of viewers may provide their viewer responses (i.e., reactions or sharing their emotions) in response to unfolding events during a live program by providing a selection input on an option among the options, which are then captured as viewer interaction data. In an embodiment, the viewer interaction data is collated within a predefined time of the detected event. In one illustrative example, a batsman may get out which is detected as an event and the plurality of options are provisioned for viewers for the predefined time of 30 seconds and viewer expressions collated over this predefined time configure the viewer interaction data. It shall be noted that each viewer may provide one or more expressions (i.e., more than one response) in relation to the detected event by clicking on more than one option among the plurality of options.

At operation 706 of the method 700, the viewer interaction data received from the plurality of viewers is aggregated. As explained with reference to FIG. 3, the viewer interaction data received in response to a detected event from the plurality of viewers is aggregated into a set of viewer response categories. More specifically, the aggregated viewer interaction data (i.e., viewer responses from the plurality of viewers) is analyzed and classified into a viewer response category of the plurality of viewer response categories. Each viewer response category defines an expression category in relation to the detected event. In one illustrative example, emoticons indicating jeering, textual inputs indicating booing, and audio signals indicating jeering/booing are classified as a viewer response category indicating 'disapproval'. Similarly, emoticons indicating encouraging a player and audio inputs with encouraging sounds are classified as a viewer response category indicating 'motivation'. Further, a count value in relation to each viewer response category may be determined.

At operation 708 of the method 700, a cheering audio is synthesized in relation to the detected event based, at least in part, on the aggregated viewer interaction data. More specifically, one or more chants are selected in relation to the set of viewer response categories from a chant repository. In one embodiment, a time length of the cheering audio may be equal to a predetermined value. In general, at least one chant is selected corresponding to the each viewer response category. In one illustrative example, a football team may lead the scorecard and hence may be playing a defensive game which may be uneventful for the viewers and may be detected as an event. In such a scenario, fans of the opponent team may cheer their team by providing viewer interaction data, for example, selecting a cheering emoticon. Accordingly, a chant selected from the chant repository for motivating the team will be 'WE WILL . . . WE WILL ROCK YOU'. It shall be noted that the chant repository includes a plurality of pre-recorded chants corresponding to a variety of live programs, incidents within the live programs, personalities involved in the live programs, and the like. As such, the at least one chant is selected from among the plurality of pre-recorded chants based on the corresponding viewer response category and the detected event. For example, the at least one chant may be determined based on the viewer response category (e.g., dissatisfied, cheering, celebration, etc.) and event attributes associated with the event such as, the type of livestreaming content (sport, musical concert, dance show, etc.), type of event (player injury, goal, a wicket, winning team, popular song request, popular performer, etc.). In an embodiment, audio signals corresponding to the one or more chants are determined. Further, intensity values of the audio signals associated with the one or more chants are adapted based, at least in part, on count values in relation to the set of viewer response categories. The length of audio signals may be determined based, at least in part, on audio parameters (e.g., time duration) associated with the at least one chant. In general, a large number of viewers (for example, 10000 viewers) celebrate a goal (i.e., event) scored by a player in soccer whereas a very a smaller number of viewers cry foul play over the scored goal. As such, the audio signal of chants corresponding to the viewers celebrating the goal will be of higher intensity when compared with the audio signal corresponding to chants in which the viewers cry foul. Thus, the audio intensity (i.e., volume level) of the audio signal corresponding to a selected chant may be adapted based on the count value associated with a corresponding viewer response category.

Alternatively or additionally, the audio signals corresponding to the one or more chants are combined with a corresponding portion of the live audio feed to synthesize the cheering audio. The live audio feed is received from one or more sensors configured at an event venue associated with the livestreaming content. In general, the cheering audio may be synthesized by mixing audio signals corresponding to the real-time event data and one or more audio signals corresponding to the selected chants.

At operation 710 of the method 700, an enriched livestreaming content is generated based on the livestreaming content and the cheering audio. More specifically, the cheering audio is audio-mixed with corresponding audio portions of the livestreaming content to generate the enriched livestreaming content.

At operation 712 of the method 700, playback of the enriched livestreaming content is facilitated on the respective electronic devices for the plurality of viewers. The enriched livestreaming content is configured to simulate an experience of attending the live program for the content viewer. The method 700 ends at operation 712.

Figure 8:
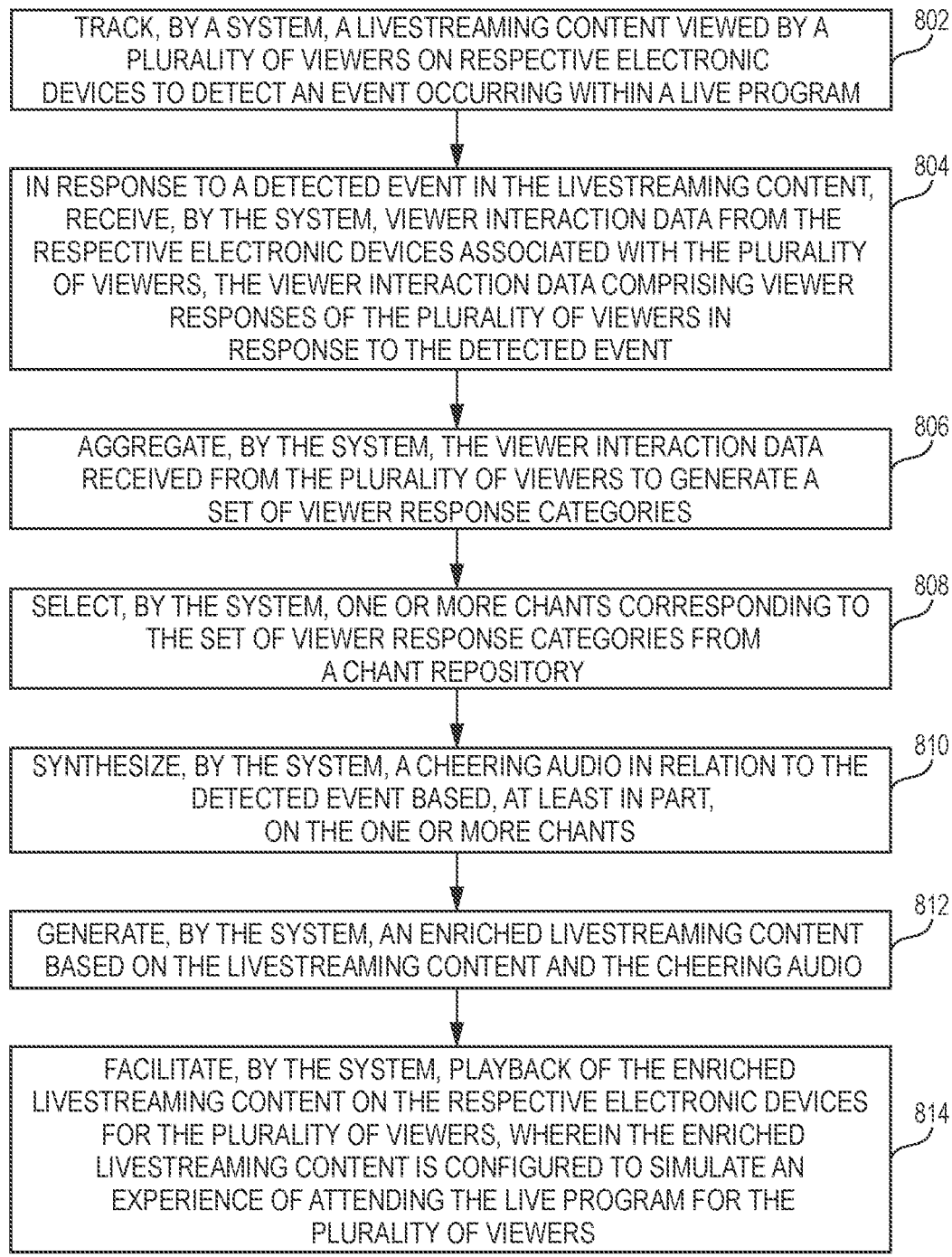
FIG. 8 shows a flow diagram of a method for facilitating simulation of experience of attending a live program for viewers of livestreaming content, in accordance with another embodiment of the invention.

FIG. 8 shows a flow diagram of a method 800 for facilitating the simulation of experience of attending a live program for viewers of livestreaming content, in accordance with another embodiment of the invention. The various steps and/or operations of the flow diagram, and combinations of steps/operations in the flow diagram, may be implemented by, for example, hardware, firmware, a processor, circuitry, and/or by a system such as the system 150 explained with reference to FIGS. 1 to 6 and/or by a different device associated with the execution of software that includes one or more computer program instructions. The method 800 starts at operation 802.

At operation 802 of the method 800, a livestreaming content viewed by a plurality of viewers on respective electronic devices is tracked by a system such as, the system 150 (explained with reference to FIGS. 1-6) to detect an event. In an embodiment, one or more sources related to the livestreaming content are tracked to detect one or more events in the livestreaming content.

At operation 804 of the method 800, viewer interaction data is received from the respective electronic devices associated with the plurality of viewers in response to a detected event in the livestreaming content. The viewer interaction data includes viewer responses of the plurality of viewers in response to the detected event. An example of providing viewer response in response to a detected event is shown and explained with reference to FIG. 3 and is not explained herein for the sake of brevity.

At operation 806 of the method 800, the viewer interaction data received from the plurality of viewers are aggregated to generate a set of viewer response categories. More specifically, aggregated viewer interaction data (i.e., viewer responses from the plurality of viewers) received within the predefined time are analyzed and classified into a viewer response category of the plurality of viewer response categories. Each viewer response category defines an expression category (for example, appreciate, jeer, etc.) in relation to the detected event.

At operation 808 of the method 800, one or more chants corresponding to the set of viewer response categories are selected from a chant repository. In general, at least one chant is selected corresponding to each viewer response category. The chant repository includes a plurality of pre-recorded chants corresponding to a variety of live programs, incidents within the live programs, personalities involved in the live programs, and the like. As such, the at least one chant is selected from among the plurality of pre-recorded chants based on the corresponding viewer response category and the detected event.

At operation 810 of the method 800, a cheering audio is synthesized in relation to the detected event based, at least in part, on the one or more chants. Audio signals associated with the one or more chants are combined together to generate the cheering audio by adapting intensity values of the audio signals based on count values in relation to the set of viewer response categories.

In one embodiment, audio signals corresponding to the one or more chants may be combined with a corresponding portion of live audio feed to synthesize the cheering audio. The live audio feed is received from one or more sensors configured at an event venue associated with the livestreaming content. The live audio feed may include sounds of spectators, commentators, players, and the like as would be normally audible at an event venue.

At operation 812 of the method 800, an enriched livestreaming content is generated based on the livestreaming content and the cheering audio. The cheering audio is combined with a corresponding audio portion of the livestreaming content to synthesize the enriched livestreaming content.

At operation 814 of the method 800, playback of the enriched livestreaming content is facilitated on the respective electronic devices for the plurality of viewers. The enriched livestreaming content is configured to simulate an experience of attending the live program for the plurality of viewers.

Various embodiments disclosed herein provide numerous advantages. More specifically, the embodiments disclosed herein suggest techniques for simulating the experience of attending a live program for viewers of livestreaming content. The viewers of the livestreaming content, i.e. the content viewers, are provided with several options to express emotions or reactions to various unfolding events in the live program. The emotions shared by the content viewers are used to create an enriched livestreaming content stream, which is capable of mimicking the feeling of being present at the event venue. More specifically, the chants in the audience are expertly adapted in volume and/or intensity and mixed with existing audio of the livestreaming content to simulate the experience of attending the live program. Such, audio-mixing of the livestreaming content with synthesized cheering audio in substantially real-time enhances viewer experience and simulates an experience of attending the live program for the plurality of viewers. As the content viewer is engaged throughout the course of the live program (by sharing emotions and expressing reactions) and also experiencing the in-venue feeling, the overall experience of the viewer of livestreaming content is increased manifold.

Further, the adaptation of livestreaming content in near real-time as described herein is a computer-based solution to a technical deficiency or problem that is itself rooted in computer technology (e.g., the problem itself derives from the use of computer technology). More specifically, adapting livestreaming content in near real-time based on user feedback of remote viewers is a significant problem, especially with limited computer resources on the server-side. The present disclosure enables enriching the livestreaming content with a cheering audio, where the cheering audio is determined based on real-time user feedback from remote viewers. Furthermore, the present disclosure provides significantly more robust solutions because of handling simultaneous/concurrent processor execution (such as aggregating viewer interaction data, and synthesizing cheering audio based on aggregated viewer interaction data, simultaneously).

Although the present invention has been described with reference to specific exemplary embodiments, it is noted that various modifications and changes may be made to these embodiments without departing from the broad spirit and scope of the present invention. For example, the various operations, blocks, etc., described herein may be enabled and operated using hardware circuitry (for example, complementary metal-oxide semiconductor (CMOS) based logic circuitry), firmware, software, and/or any combination of hardware, firmware, and/or software (for example, embodied in a machine-readable medium). For example, the apparatuses and methods may be embodied using transistors, logic gates, and electrical circuits (for example, application-specific integrated circuit (ASIC) circuitry and/or Digital Signal Processor (DSP) circuitry).

Particularly, the system 150 and its various components such as the processor 152, the memory 154, the I/O module 160, and the communication module 162 may be enabled using software and/or using transistors, logic gates, and electrical circuits (for example, integrated circuit circuitry such as ASIC circuitry). Various embodiments of the present invention may include one or more computer programs stored or otherwise embodied on a computer-readable medium, wherein the computer programs are configured to cause a processor of the computer to perform one or more operations (for example, operations explained herein with reference to FIG. 7 or 8). A computer-readable medium storing, embodying, or encoded with a computer program, or similar language may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer-readable media. Non-transitory computer-readable media include any type of tangible storage media. Examples of non-transitory computer-readable media include magnetic storage media (such as floppy disks, magnetic tapes, hard disk drives, etc.), optical magnetic storage media (e.g., magneto-optical disks), CD-ROM (compact disc read-only memory), CD-R (compact disc recordable), CD-R/W (compact disc rewritable), DVD (Digital Versatile Disc), BD (Blu-ray (registered trademark) Disc), and semiconductor memories (such as mask ROM, PROM (programmable ROM), EPROM (erasable PROM), flash ROM, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer-readable media. Examples of transitory computer-readable media include electric signals, optical signals, and electromagnetic waves. Transitory computer-readable media can provide the program to a computer via a wired communication line (e.g., electric wires, and optical fibers) or a wireless communication line.

Various embodiments of the present invention, as discussed above, may be practiced with steps and/or operations in a different order, and/or with hardware elements in configurations, which are different than those which are disclosed. Therefore, although the invention has been described based upon these exemplary embodiments, it is noted that certain modifications, variations, and alternative constructions may be apparent and well within the scope of the invention.

Although various exemplary embodiments of the present invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method for simulating experience of attending a live program conducted at an event venue for viewers of a livestreaming content associated with the live program, the computer-implemented method comprising:
   tracking, by a system, the livestreaming content viewed by a plurality of viewers on respective electronic devices to detect an event, occurring at the event venue associated with the livestreaming content, during the live program;
   in response to a detected event in the livestreaming content, receiving, by the system, viewer interaction data from the respective electronic devices associated with the plurality of viewers, the viewer interaction data comprising viewer responses of the plurality of viewers in response to the detected event;
   aggregating, by the system, the viewer interaction data received from the plurality of viewers;
   synthesizing, by the system, a cheering audio in relation to the detected event based, at least in part, on the aggregated viewer interaction data;
   generating, by the system, an enriched livestreaming content based on the livestreaming content and the cheering audio; and
   facilitating, by the system, playback of the enriched livestreaming content on the respective electronic devices for the plurality of viewers, the enriched livestreaming content configured to simulate an experience of attending the live program for the plurality of viewers.

2. The computer-implemented method as claimed in claim 1, wherein the viewer interaction data for the detected event is received from the plurality of viewers within a predefined time.

3. The computer-implemented method as claimed in claim 2, wherein receiving the viewer interaction data comprises:
displaying, by the system, a plurality of options on a User Interface (UI) of the respective electronic devices of the plurality of viewers to prompt the plurality of viewers for providing the viewer responses in response to the detected event.

4. The computer-implemented method as claimed in claim 3, wherein the plurality of options comprises one or more of: selectable emoticons, selectable animated images, text messages, audio messages, video messages, gestures, and body movements.

5. The computer-implemented method as claimed in claim 1, wherein aggregating the viewer interaction data comprises:
classifying, by the system, the viewer interaction data received from the plurality of viewers into a set of viewer response categories, wherein each viewer response category of the set of viewer response categories defines an expression category in relation to the detected event; and
determining, by the system, count values in relation to the set of viewer response categories based, at least in part, on the viewer responses of the plurality of viewers.

6. The computer-implemented method as claimed in claim 5, further comprising:
selecting, by the system, one or more chants corresponding to the set of viewer response categories from a chant repository; and
adapting intensity values of audio signals associated with the one or more chants based, at least in part, on the count values in relation to the set of viewer response categories.

7. The computer-implemented method as claimed in claim 6, wherein the one or more chants are selected from among a plurality of pre-recorded chants based, at least in part, on the set of viewer response categories and the detected event.

8. The computer-implemented method as claimed in claim 6, wherein synthesizing the cheering audio comprises combining the audio signals associated with the one or more chants based, at least in part, on the intensity values of the audio signals, and wherein a time length of the cheering audio is at least equal to a predetermined value.

9. The computer-implemented method as claimed in claim 8, wherein generating the enriched livestreaming content comprises combining the cheering audio with a corresponding audio portion of the livestreaming content.

10. The computer-implemented method as claimed in claim 1, further comprising:
detecting, by the system, one or more events in the livestreaming content based on analysis of one or more data sources related to the livestreaming content, wherein the one or more data sources comprise at least one of: a scorecard, video signal and an audio signal.

11. A system for simulating experience of attending a live program conducted at an event venue for viewers of a livestreaming content associated with the live program, the system comprising:
a memory for storing instructions; and
a processor configured to execute the instructions and thereby cause the system to at least:
track the livestreaming content viewed by a plurality of viewers on respective electronic devices to detect an event, occurring at the event venue associated with the livestreaming content, during the live program;
in response to a detected event in the livestreaming content, receive viewer interaction data from the respective electronic devices associated with the plurality of viewers, the viewer interaction data comprising viewer responses of the plurality of viewers in response to the detected event;
aggregate the viewer interaction data received from the plurality of viewers;
synthesize a cheering audio in relation to the detected event based, at least in part, on the aggregated viewer interaction data;
generate an enriched livestreaming content based on the livestreaming content and the cheering audio; and
facilitate playback of the enriched livestreaming content on the respective electronic devices for the plurality of viewers, wherein the enriched livestreaming content is configured to simulate an experience of attending the live program for the plurality of viewers.

12. The system as claimed in claim 11, wherein the viewer interaction data for the detected event is received from the plurality of viewers within a predefined time.

13. The system as claimed in claim 12, wherein for receiving the viewer interaction data, the system is caused to:
display a plurality of options on a User Interface (UI) of each electronic device of the respective electronic devices associated with the plurality of viewers to prompt the plurality of viewers for providing the viewer responses in response to the detected event.

14. The system as claimed in claim 13, wherein the plurality of options comprises one or more of: selectable emoticons, selectable animated images, text messages, audio messages, video messages, gestures, and body movements.

15. The system as claimed in claim 13, wherein, to aggregate the viewer interaction data, the system is caused to:
classify the viewer interaction data received from the plurality of viewers into a set of viewer response categories, wherein each viewer response category of the set of viewer response categories defines an expression category in relation to the detected event; and
determine count values in relation to the set of viewer response categories based, at least in part, on the viewer responses of the plurality of viewers.

16. The system as claimed in claim 15, wherein the system is further caused to:
select one or more chants corresponding to the set of viewer response categories from a chant repository; and
adapt intensity values of audio signals associated with the one or more chants based, at least in part, on the count values in relation to the set of viewer response categories.

17. The system as claimed in claim 16, wherein the one or more chants are selected from among a plurality of pre-recorded chants based, at least in part, on the each viewer response category and the detected event.

18. The system as claimed in claim 16, wherein, to synthesize the cheering audio, the system is caused to combine the audio signals associated with the one or more chants based, at least in part, on the intensity values of the audio signals, and wherein a time length of the cheering audio is at least equal to a predetermined value.

19. The system as claimed in claim 18, wherein, to generate the enriched livestreaming content, the system is caused to combine the cheering audio with a corresponding audio portion of the livestreaming content.

20. The system as claimed in claim 11, wherein the system is further caused to:
   detect one or more events in the livestreaming content based on analysis of one or more data sources related to the livestreaming content, wherein the one or more data sources comprise at least one of: a scorecard, video signal, and an audio signal.

21. A computer-implemented method for simulating experience of attending a live program conducted at an event venue for viewers of a livestreaming content associated with the live program, the computer-implemented method comprising:
   tracking, by a system, the livestreaming content viewed by a plurality of viewers on respective electronic devices to detect an event, occurring at the event venue associated with the livestreaming content, during the live program;
   in response to a detected event in the livestreaming content, receiving, by the system, viewer interaction data from the respective electronic devices associated with the plurality of viewers, the viewer interaction data comprising viewer responses of the plurality of viewers in response to the detected event;
   aggregating, by the system, the viewer interaction data received from the plurality of viewers to generate a set of viewer response categories;
   selecting, by the system, one or more chants corresponding to the set of viewer response categories from a chant repository;
   synthesizing, by the system, a cheering audio in relation to the detected event based, at least in part, on the one or more chants;
   generating, by the system, an enriched livestreaming content based on the livestreaming content and the cheering audio; and
   facilitating, by the system, playback of the enriched livestreaming content on the respective electronic devices for the plurality of viewers, wherein the enriched livestreaming content is configured to simulate an experience of attending the live program for the plurality of viewers.

22. The computer-implemented method as claimed in claim 21, wherein receiving the viewer interaction data comprises:
   displaying, by the system, a plurality of options on a User Interface (UI) of the respective electronic devices of the plurality of viewers to prompt the plurality of viewers for providing the viewer responses in response to the detected event.

23. The computer-implemented method as claimed in claim 22, wherein the plurality of options comprises one or more of: selectable emoticons, selectable animated images, text messages, audio messages, video messages, gestures, and body movements.

24. The computer-implemented method as claimed in claim 21, wherein aggregating the viewer interaction data comprises:
   classifying, by the system, the viewer interaction data received from the plurality of viewers into the set of viewer response categories, wherein each viewer response category of the set of viewer response categories defines an expression category in relation to the detected event; and
   determining, by the system, count values in relation to the set of viewer response categories based, at least in part, on the viewer responses of the plurality of viewers.

25. The computer-implemented method as claimed in claim 24, further comprising adapting, by the system, intensity values of audio signals associated with the one or more chants based, at least in part, on the count values in relation to the set of viewer response categories.

* * * * *